US011086395B2

(12) United States Patent
Okutani

(10) Patent No.: US 11,086,395 B2
(45) Date of Patent: Aug. 10, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yasuo Okutani, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/774,476

(22) Filed: Jan. 28, 2020

(65) Prior Publication Data

US 2020/0265633 A1 Aug. 20, 2020

(30) Foreign Application Priority Data

Feb. 15, 2019 (JP) .............................. JP2019-025788

(51) Int. Cl.
| | |
|---|---|
| *G06F 3/01* | (2006.01) |
| *G06F 3/0346* | (2013.01) |
| *G02B 27/01* | (2006.01) |
| *G06F 3/033* | (2013.01) |
| *G06T 15/20* | (2011.01) |

(52) U.S. Cl.
CPC ............ *G06F 3/011* (2013.01); *G02B 27/017* (2013.01); *G06F 3/012* (2013.01); *G06F 3/033* (2013.01); *G06F 3/0346* (2013.01); *G06T 15/20* (2013.01)

(58) Field of Classification Search
CPC ........ G06F 3/011; G06F 3/033; G06F 3/0346; G06F 3/012; G02B 27/017; G02B 2027/0138; G02B 2027/014; G06T 15/20
See application file for complete search history.

(56) References Cited

U.S. PATENT DOCUMENTS

| | | | | | |
|---|---|---|---|---|---|
| 5,446,834 | A | * | 8/1995 | Deering | ............. G02B 27/0093 345/427 |
| 6,011,581 | A | * | 1/2000 | Swift | ................... H04N 13/243 348/58 |
| 6,045,229 | A | * | 4/2000 | Tachi | ................. G02B 27/0093 345/7 |
| 6,822,643 | B2 | * | 11/2004 | Matsui | .................... G06F 3/011 345/157 |
| 7,719,563 | B2 | * | 5/2010 | Richards | .............. H04N 21/242 348/36 |

(Continued)

FOREIGN PATENT DOCUMENTS

JP 2018036956 A 3/2018

*Primary Examiner* — Michael J Jansen, II

(74) *Attorney, Agent, or Firm* — Carter, Deluca & Farrell LLP

(57) ABSTRACT

An image processing apparatus obtains a plurality of images based on image capturing performed by a plurality of image capturing apparatuses, receives an input corresponding to operation of a first device, receives an input corresponding to operation of a second device different from the first device; and generates, based on the plurality of images obtained, a first virtual viewpoint image corresponding to a first virtual viewpoint determined based on the input corresponding to the operation of the first device, wherein a second virtual viewpoint image corresponding to a second virtual viewpoint determined based on the input received by the second receiving unit is displayed within the first virtual viewpoint image.

20 Claims, 10 Drawing Sheets

(56) References Cited

U.S. PATENT DOCUMENTS

| | | | | |
|---|---|---|---|---|
| 8,022,967 B2* | 9/2011 | Okuno | | G06F 3/011 |
| | | | | 345/633 |
| 9,215,293 B2* | 12/2015 | Miller | | H04L 67/38 |
| 9,873,048 B2* | 1/2018 | Yoshioka | | G06T 19/006 |
| 10,013,812 B2* | 7/2018 | Muta | | G06F 3/013 |
| 10,127,713 B2* | 11/2018 | Kashihara | | G06F 3/012 |
| 10,365,784 B2* | 7/2019 | Inomata | | A63F 13/25 |
| 10,599,286 B2* | 3/2020 | Inomata | | A63F 13/213 |
| 10,607,398 B2* | 3/2020 | Yoshioka | | G06F 3/011 |
| 10,834,477 B2* | 11/2020 | Okutani | | G06T 15/205 |
| 10,936,149 B2* | 3/2021 | Inomata | | A63F 13/211 |
| 2001/0056574 A1* | 12/2001 | Richards | | G06T 15/10 |
| | | | | 725/36 |
| 2002/0060648 A1* | 5/2002 | Matsui | | G06F 3/0304 |
| | | | | 345/8 |
| 2005/0128286 A1* | 6/2005 | Richards | | H04N 21/23614 |
| | | | | 348/36 |
| 2006/0044327 A1* | 3/2006 | Okuno | | G06F 3/011 |
| | | | | 345/626 |
| 2008/0316203 A1* | 12/2008 | Sandor | | G06F 3/012 |
| | | | | 345/419 |
| 2009/0096714 A1* | 4/2009 | Yamada | | G02B 27/017 |
| | | | | 345/8 |
| 2013/0117377 A1* | 5/2013 | Miller | | A63F 13/35 |
| | | | | 709/205 |
| 2017/0076428 A1* | 3/2017 | Ishikawa | | G06K 9/00671 |
| 2017/0228923 A1* | 8/2017 | Kashihara | | G06T 15/20 |
| 2017/0232343 A1* | 8/2017 | Yoshioka | | A63F 13/525 |
| | | | | 463/31 |
| 2017/0263058 A1* | 9/2017 | Muta | | A63F 13/25 |
| 2018/0005431 A1* | 1/2018 | Yoshioka | | G06F 3/011 |
| 2018/0341386 A1* | 11/2018 | Inomata | | A63F 13/211 |
| 2019/0011981 A1* | 1/2019 | Noguchi | | G06F 3/017 |
| 2019/0079597 A1* | 3/2019 | Kada | | G06F 3/014 |
| 2019/0087068 A1* | 3/2019 | Noguchi | | G06F 3/04815 |
| 2019/0196689 A1* | 6/2019 | Inomata | | G02B 27/0093 |
| 2019/0297393 A1* | 9/2019 | Okutani | | H04N 7/181 |
| 2020/0159389 A1* | 5/2020 | Inomata | | H04L 67/38 |
| 2020/0265633 A1* | 8/2020 | Okutani | | G06T 15/20 |
| 2021/0004076 A1* | 1/2021 | Schweet | | G06N 20/00 |

* cited by examiner

US 11,086,395 B2

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium.

Description of the Related Art

In recent years, a technology has drawn attention in which synchronous image capturing is performed from multiple viewpoints using a plurality of cameras installed at different positions and in which multi-viewpoint images obtained by the synchronous image capturing are used to generate virtual viewpoint images observed from freely selected viewpoints, as well as images from the camera installation positions. Generation and browsing of such virtual viewpoint images can be realized by integrating images captured by a plurality of cameras in an image processing unit of a server apparatus or the like; performing, by the image processing unit, processing such as rendering based on viewpoints; and displaying the virtual viewpoint images on a user terminal.

Japanese Patent Laid-Open No. 2018-036956 discloses a technology for overlapping, on a two-dimensional display, two virtual viewpoint images having the same line-of-sight direction.

However, in the technology described in Japanese Patent Laid-Open No. 2018-036956, while viewing a virtual viewpoint image corresponding to one virtual viewpoint, a user cannot view a virtual viewpoint image from another virtual viewpoint that can be designated independently of the virtual viewpoint. For example, by displaying a virtual viewpoint image with parallax on right and left displays of a head-mounted display (referred to as HMD below), an HMD wearer can experience a state in which the HMD wearer is in a three-dimensional virtual space constructed of a virtual viewpoint image. The technology does not allow viewing, in the three-dimensional virtual space constructed of such a virtual viewpoint image, a virtual viewpoint image corresponding to another virtual viewpoint designated by the HMD wearer.

SUMMARY OF THE INVENTION

According to one aspect of the present invention, there is provided an image processing apparatus comprising: an image obtaining unit configured to obtain a plurality of images based on image capturing performed by a plurality of image capturing apparatuses; a first receiving unit configured to receive an input corresponding to operation of a first device; a second receiving unit configured to receive an input corresponding to operation of a second device different from the first device; and a generating unit configured to generate, based on the plurality of images obtained, a first virtual viewpoint image corresponding to a first virtual viewpoint determined based on the input received by the first receiving unit, wherein a second virtual viewpoint image corresponding to a second virtual viewpoint determined based on the input received by the second receiving unit is displayed within the first virtual viewpoint image.

According to another aspect of the present invention, there is provided an image processing method comprising: obtaining a plurality of images based on image capturing performed by a plurality of image capturing apparatuses; receiving an input corresponding to operation of a first device; receiving an input corresponding to operation of a second device different from the first device; and generating, based on the plurality of images obtained, a first virtual viewpoint image corresponding to a first virtual viewpoint determined based on the input corresponding to the operation of the first device, wherein a second virtual viewpoint image corresponding to a second virtual viewpoint determined based on the input received by the second receiving unit is displayed within the first virtual viewpoint image.

According to another aspect of the present invention, there is provided a non-transitory computer readable storage medium storing a program for causing a computer to perform an image processing method, the method comprising: obtaining a plurality of images based on image capturing performed by a plurality of image capturing apparatuses; receiving an input corresponding to operation of a first device; receiving an input corresponding to operation of a second device different from the first device; and generating, based on the plurality of images obtained, a first virtual viewpoint image corresponding to a first virtual viewpoint determined based on the input corresponding to the operation of the first device, wherein a second virtual viewpoint image corresponding to a second virtual viewpoint determined based on the input received by the second receiving unit is displayed within the first virtual viewpoint image.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that

First Embodiment

In a first embodiment, a case will be described in which camera operations are performed on a virtual viewpoint image in a three-dimensional virtual space constructed of a virtual viewpoint image.

Figure 1:
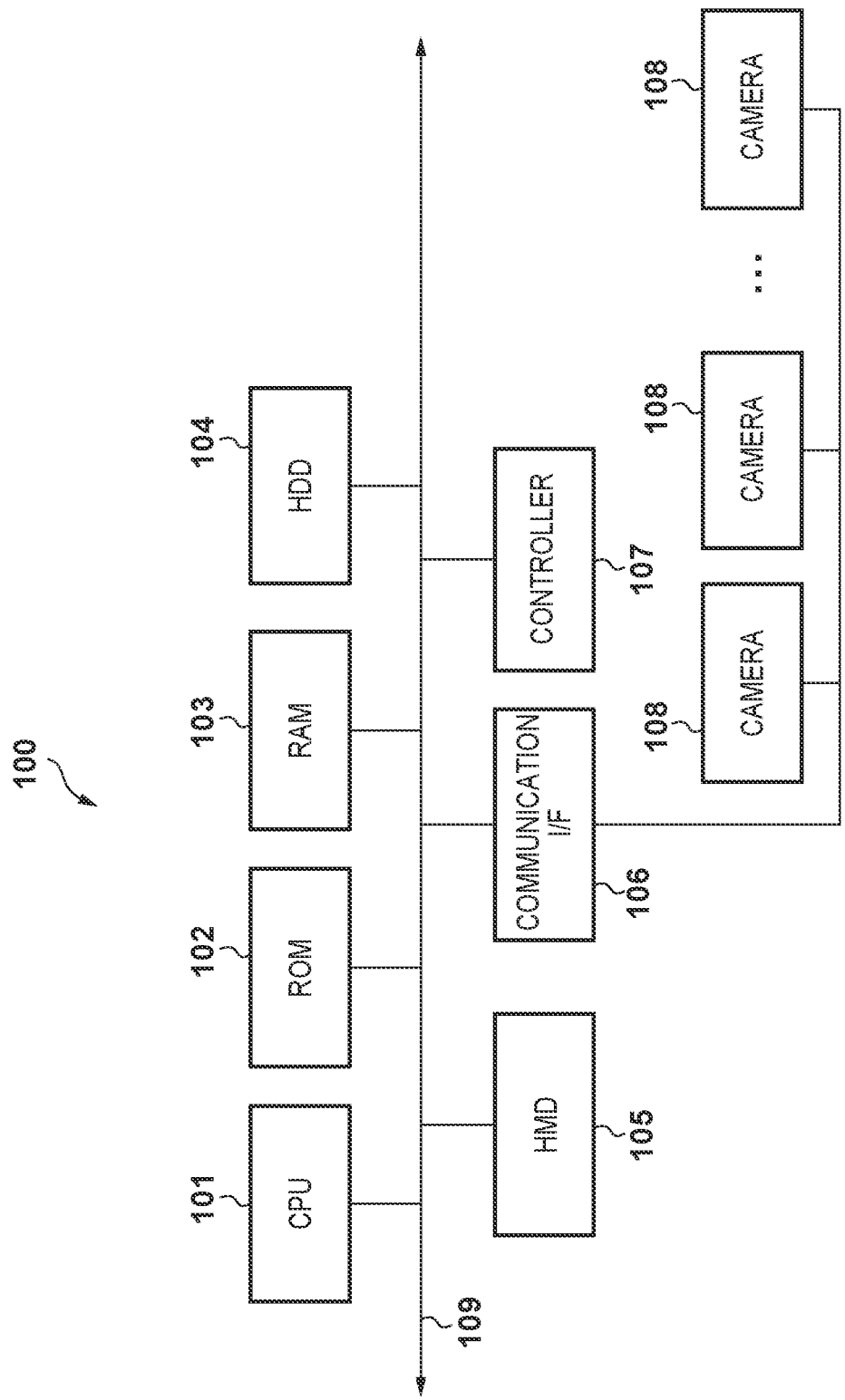
FIG. 1 is a block diagram illustrating an example of a hardware configuration of an image generating apparatus according to a first embodiment.

FIG. 1 is a block diagram illustrating a hardware configuration of an image generating apparatus 100 according to the first embodiment. A CPU (Central Processing Unit) 101 performs arithmetic operations, logical determinations, and the like for various types of processing, and the CPU 101 controls each component connected to a system bus 109. The image generating apparatus 100 is mounted with a memory including a program memory and a data memory. For example, a ROM (Read-Only Memory) 102 is a program memory that stores programs for control by CPU, including various processing procedures described below. Additionally, for example, a RAM (Random Access Memory) 103 is a data memory and includes a work area for the above-described programs for the CPU 101, a save area for data during error handling, a load area for the control programs, and the like. Note that the program memory may be realized by loading the programs into the RAM 103 from an external storage apparatus or the like connected to the image generating apparatus 100.

An HDD (Hard Disk Drive) 104 is a hard disk that stores a plurality of electronic data and programs according to the first embodiment. The external storage device described above may be used to perform similar roles. The external storage device can be realized, for example, with a medium (recording medium) and an external storage drive that implement access to the medium. Known examples of such a medium include a flexible disk (FD), a CD-ROM, a DVD, a USB memory, an MO, a flash memory, and the like. The external storage apparatus may be a server apparatus connected by a network or the like.

A head-mounted display (hereinafter referred to as an HMD 105) is a device that displays output from the image generating apparatus 100 on displays disposed at the positions of the right and left eyes. The HMD 105 also functions as a device for inputting the position and orientation (direction) of the user's head to the image generating apparatus 100. In the first embodiment, in order to construct a three-dimensional virtual space using parallax, two types of virtual viewpoint images for the right and left eyes obtained in consideration of parallax are displayed on the displays disposed at the positions of the right and left eyes. A communication I/F 106 is connected by wire or wirelessly to a plurality of cameras (image capturing apparatuses) 108 by a known communication technology, to receive captured image data and to transmit virtual viewpoint images generated to a broadcasting station or the like. A controller 107 is, for example, an input device that can be held and carried by a user in hand and outputs the position and orientation (direction) of the controller 107 to the image generating apparatus 100.

Figure 7A:
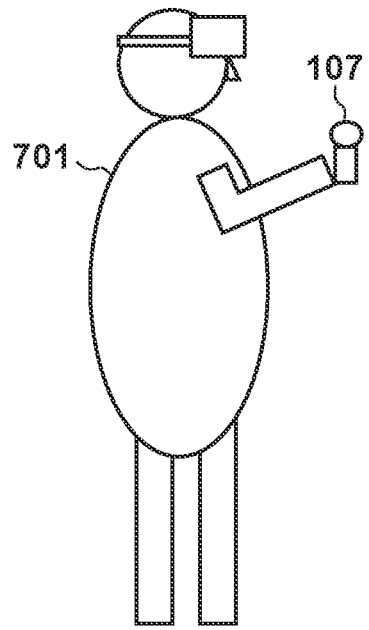
FIGS. 7A and 7B are schematic diagrams illustrating a correspondence relationship between a three-dimensional physical space and a three-dimensional virtual space.
Figure 7B:
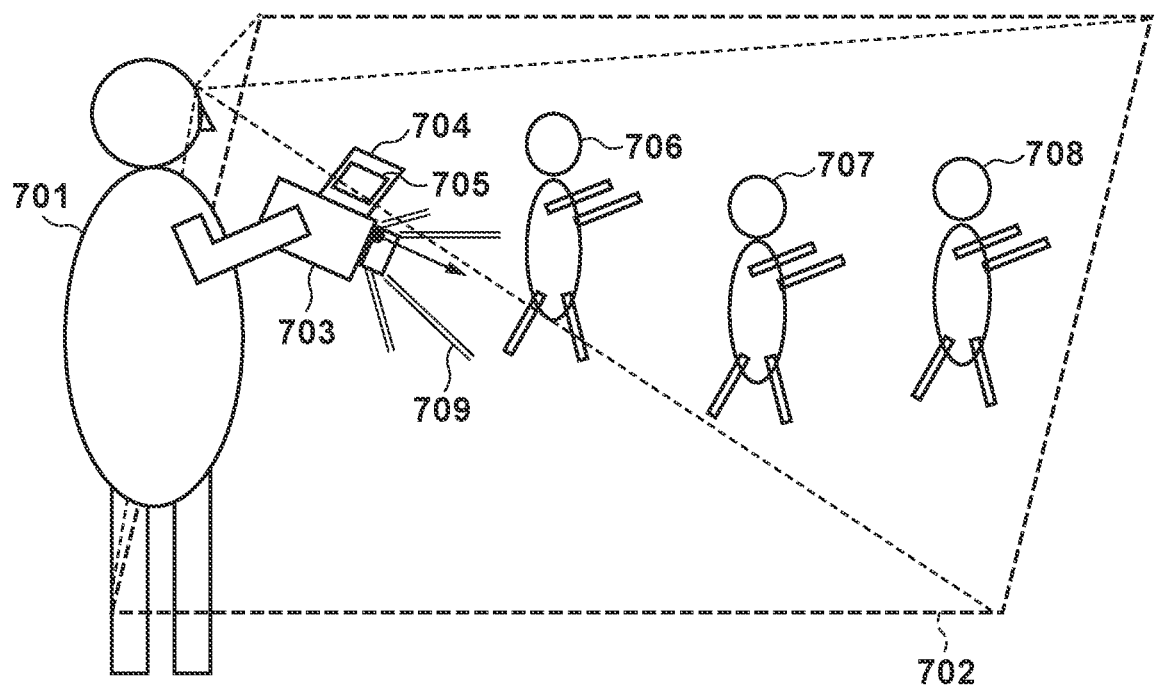

FIGS. 7A and 7B are schematic diagrams illustrating a relationship between a three-dimensional physical space and a three-dimensional virtual space according to the present embodiment. FIG. 7A is a schematic diagram illustrating a three-dimensional physical space. A user 701 in the three-dimensional physical space wears the HMD 105 and holds the controller 107 in hand. FIG. 7B is a schematic diagram illustrating a three-dimensional virtual space. The user 701 observes a three-dimensional virtual space 702 via the HMD 105. Additionally, the controller 107 (FIG. 7A) in the three-dimensional physical space held by the user 701 is observed as a virtual camera 703 in the three-dimensional virtual space 702. Additionally, a virtual display 704 attached to the virtual camera 703 is displayed virtually via the HMD 105.

A virtual viewpoint image of the three-dimensional virtual space 702 captured virtually by the virtual camera 703 is displayed in a display area 705 of the virtual display 704. In other words, the virtual viewpoint image generated based on the virtual viewpoint identified by the virtual camera 703 is displayed virtually on the virtual display 704 attached to the virtual camera 703. Here, the displaying virtually means that the virtual viewpoint image appears to the user 701 to be displayed in the display area 705 of the virtual display 704 via HMD 105. 706, 707, and 708 are objects such as players that are present in the three-dimensional virtual space associated with an area to be imaged (image capturing area) by the plurality of cameras 108 and are displayed as a foreground. 709 is a guide line that indicates the angle of view (boundary of the image capturing area) of the virtual camera 703 in the three-dimensional virtual space constructed of the virtual viewpoint image. In FIG. 7B, the guide line 709 is indicated by four double lines. The guide line 709 allows the user 701 to recognize the angle of view of the virtual camera 703 without constantly viewing the virtual display 704.

Figure 2:
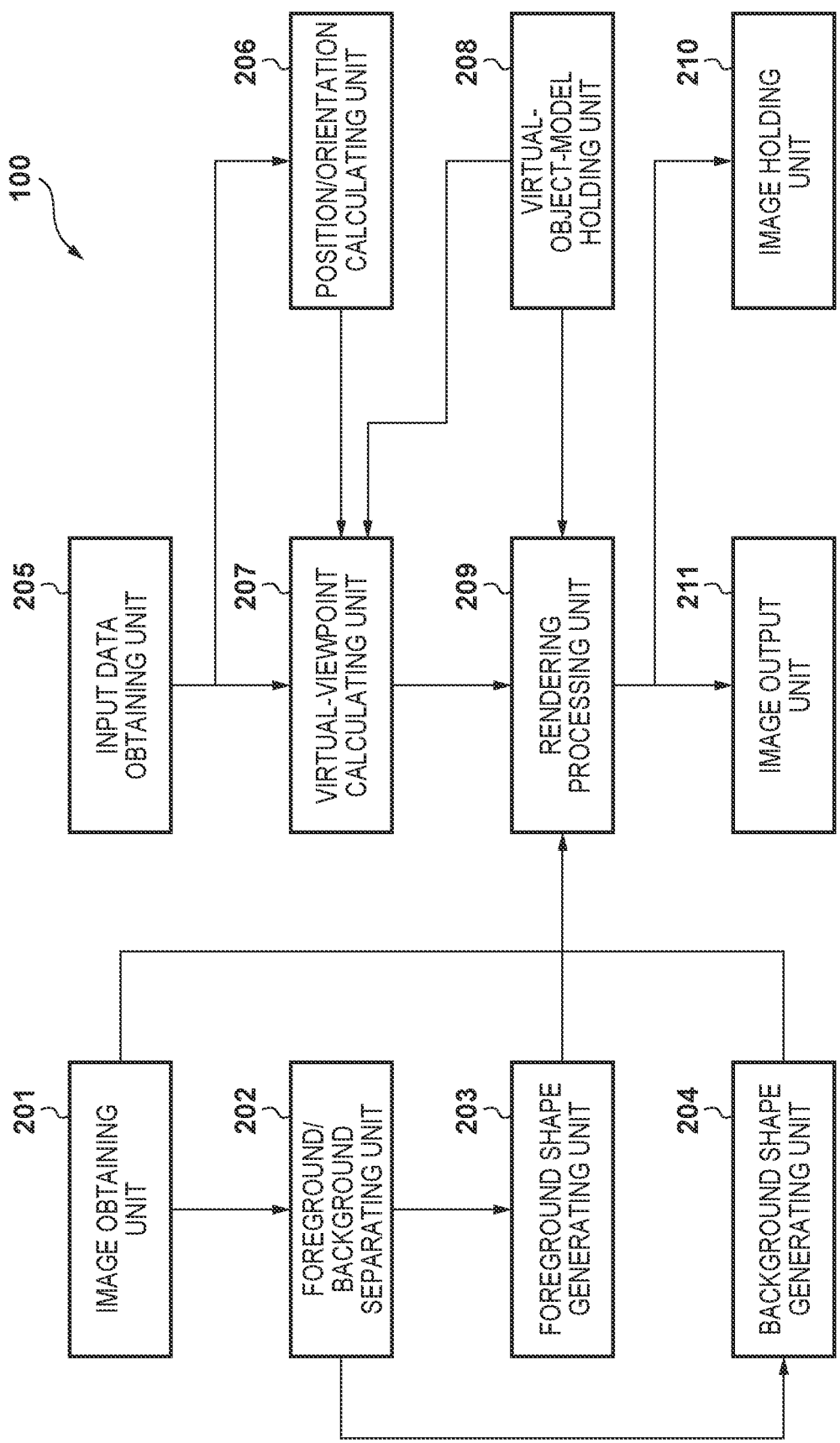
FIG. 2 is a block diagram illustrating an example of a functional configuration of the image generating apparatus according to the first embodiment.

FIG. 2 is a block diagram illustrating an example of a functional configuration of the image generating apparatus 100 according to the first embodiment. Each of the functional units included in the image generating apparatus 100 is realized by the CPU 101 by loading, into the RAM 103, a program stored in the ROM 102 and executing processing according to each flowchart described below. Note that at least a part or all of each functional unit may be realized by dedicated hardware. The functional units will be described below.

An image obtaining unit 201 obtains a plurality of images obtained by synchronous image capturing of the plurality of cameras 108. A foreground/background separating unit 202 separates an image obtained by the image obtaining unit 201 into a moving foreground and a non-moving background. An existing technique can be used for separating the foreground and the background from each other. For example, the separation may be achieved by defining, as the background, an area with no or few changes in pixels over a plurality of frames and, as the foreground, an area with changes in pixels over a plurality of frames. For example, in a case of soccer, the foreground corresponds to players and a ball, and the background corresponds to a field and a grandstand.

A foreground shape generating unit 203 estimates the three-dimensional shape of an object (player or ball) and the position of the object in the 3D virtual space based on the foreground clipped by the foreground/background separating unit 202. The foreground includes images of the object captured at various angles by the plurality of cameras 108. A method such as visual hull is generally used to estimate the three-dimensional shape. A background shape generating unit 204 estimates the three-dimensional shape of an object (such as a stadium) based on the background clipped by the foreground/background separating unit 202. In a case of a building such as a stadium, a three-dimensional shape can be prepared separately. In that case, a background model is intended to be stored in the HDD 104 in advance and read.

An input data obtaining unit 205 obtains sensing data for identifying the position/orientation of the HMD 105 worn by the user and angle-of-view data about a virtual viewpoint image displayed on the HMD 105. Additionally, the input data obtaining unit 205 obtains sensing data for identifying the position/orientation of the controller 107 held by the user. As described above, the controller 107 is observed as a virtual camera in the three-dimensional virtual space. The input data obtaining unit 205 obtains the angle-of-view data about the virtual viewpoint image displayed on the virtual display attached to the virtual camera. An existing technology can be utilized as a method for detecting (sensing) the positions/orientations of devices such as the HMD 105 and the controller 107. For example, the positions/orientations of the devices may be identified by the use of an acceleration sensor, a geomagnetic sensor, infrared radiation, a radar, or a beacon or by image processing.

Based on the sensing data obtained by the input data obtaining unit 205, a position/orientation calculating unit 206 calculates the positions/orientations of the devices in a coordinate system (hereinafter, referred to as a device coordinate system) of the place where the devices are present. In the present example, the devices are the HMD 105 and the controller 107. A virtual-viewpoint calculating unit 207 determines the position and direction of the virtual viewpoint based on the position/orientation of the device calculated by the position/orientation calculating unit 206.

Figure 10A:
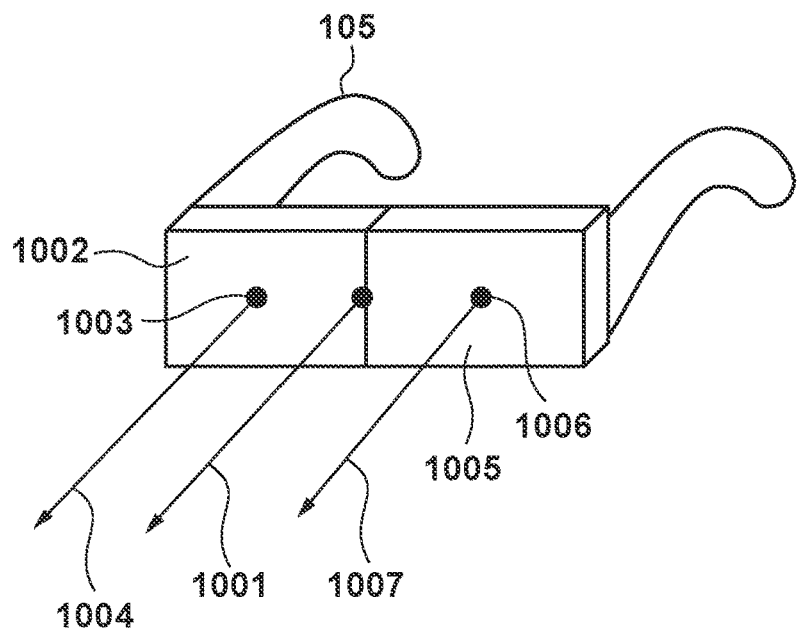
FIGS. 10A to 10C are schematic diagrams illustrating virtual viewpoints corresponding to an HMD and a controller (virtual camera).

FIG. 10A is a schematic view illustrating that virtual viewpoints of virtual viewpoint images displayed on the right and left displays of the HMD 105 is calculated based on the position/orientation of the HMD 105. In FIG. 10A, the position/orientation of the HMD 105 is represented by a vector 1001. A start point of the vector 1001 means the position of the HMD 105, and an arrow of the vector 1001 means the orientation (direction) of the HMD 105. FIG. 10A indicates that the vector is pointing forward of the HMD 105. Based on the position/orientation of the HMD 105, the positions and directions (vectors 1004 and 1007) of a right-eye display 1002 of the HMD 105 and a left-eye display 1005 of the HMD 105 are calculated based on the shape data about the HMD 105.

More specifically, the virtual-viewpoint calculating unit 207 calculates a center position 1003 of the right-eye display 1002 and a center position 1006 of the left-eye display 1005 based on the vector 1001 determined based on the position/orientation of the HMD 105. The shape data about the HMD 105 required for the calculation is intended to be obtained in advance. The virtual-viewpoint calculating unit 207 sets the center position 1003 as the position of a right-eye virtual viewpoint and sets a direction parallel to the vector 1001 as the direction of the right-eye virtual viewpoint. As a result, the right-eye virtual viewpoint represented by the vector 1004 is obtained. Similarly, the virtual-viewpoint calculating unit 207 sets the center position 1006 as the position of a left-eye virtual viewpoint to obtain the left-eye virtual viewpoint represented by the vector 1007.

As described above, the position and direction of each of the right and left virtual viewpoints are determined. However, the determined virtual viewpoints are virtual viewpoints in the device coordinate system, and thus the virtual-viewpoint calculating unit 207 converts the virtual viewpoints into virtual viewpoints in a stadium coordinate system. Note that the stadium coordinate system is an example of a coordinate system set for the space captured by the plurality of cameras 108. The present embodiment uses the term "stadium coordinate system" because the object to be captured by the plurality of cameras 108 is a stadium. However, the object to be captured by the plurality of cameras 108 is not limited to a stadium and may be, for example, a live stage or the like. Even in a case where the object to be captured is not a stadium, the device coordinate system is converted into the coordinate system corresponding to the location of the object to be captured. A general method can be used for the conversion of such a coordinate system. Both the device coordinate system and the stadium coordinate system are physical spaces, the same scale may be used for both coordinate systems. Alignment of directions of axes enables the coordinate system to be converted by simple shift movement.

Figure 10B:
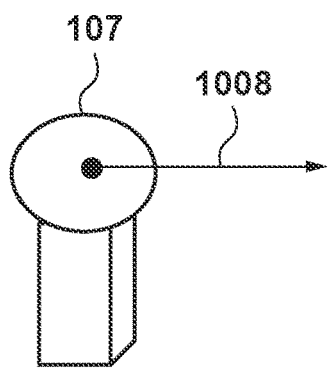
Figure 10C:
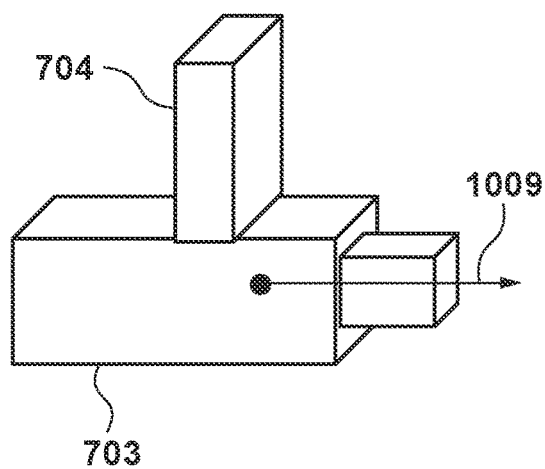

Similarly, the virtual-viewpoint calculating unit 207 calculates the virtual viewpoint of the virtual camera 703 based on the position/orientation of the controller 107 calculated by the position/orientation calculating unit 206. FIG. 10B is a schematic diagram illustrating the position/orientation of the controller 107. A start point of a vector 1008 represents the position of the controller 107, and an arrow of the vector 1008 represents the orientation of the controller 107. FIG. 10C is a schematic view of the virtual camera 703 observed in the three-dimensional virtual space. The virtual display 704 is attached to virtual camera 703. A vector 1009 is a vector indicating the position/orientation of the virtual camera 703 and is also a vector representing the virtual viewpoint identified by the virtual camera 703. The positions and directions of the controller 107 and the virtual camera 703 are associated with one another in advance by, for example, the vector 1008 and the vector 1009.

The virtual-viewpoint calculating unit 207 determines the virtual viewpoint provided by the virtual camera 703 based on the sensed position/orientation of the controller 107. The virtual viewpoint thus determined is a virtual viewpoint in the device coordinate system, and thus the virtual-viewpoint calculating unit 207 converts the virtual viewpoint into a virtual viewpoint in the stadium coordinate system. The conversion of the coordinate system is as described above for the virtual viewpoint provided by the HMD. Note that a virtual viewpoint image generated based on the virtual viewpoint of the virtual camera 703 is displayed virtually on the virtual display 704.

Referring back to FIG. 2, a rendering processing unit 209 generates a first virtual viewpoint image observed from a first virtual viewpoint (vectors 1004 and 1007) provided by the HMD 105 calculated by the virtual-viewpoint calculating unit 207. Additionally, the rendering processing unit 209 generates a second virtual viewpoint image observed from the second virtual viewpoint (vector 1009) provided by the controller 107 calculated by the virtual-viewpoint calculating unit 207. Each virtual viewpoint image is generated based on the virtual viewpoint, based on the three-dimensional shape generated by the foreground shape generating unit 203 and the background shape generating unit 204, and based on the captured image data captured by the camera 108. The generated virtual viewpoint image is held by an image holding unit 210.

The rendering processing unit 209 reads, from the image holding unit 210, the first virtual viewpoint image observed from the virtual viewpoint provided by HMD 105 and renders the image as an image of the three-dimensional virtual space. The rendering processing unit 209 renders the virtual camera 703 and the virtual display 704 in the three-dimensional virtual space in accordance with the position/orientation of the controller 107. A virtual-object-model holding unit 208 holds three-dimensional shape models of the virtual camera 703 and the virtual display 704, and the rendering processing unit 209 can use these models. Furthermore, the rendering processing unit 209 reads a second virtual viewpoint image held by the image holding unit 210 and uses the second virtual viewpoint image as a texture of the screen of the virtual display 704. In this way, the virtual viewpoint image captured by the virtual camera 703 is displayed on the virtual display 704 of the virtual camera 703 in the three-dimensional virtual space.

The image holding unit 210 holds the virtual viewpoint image generated by the rendering processing unit 209. An image output unit 211 outputs, to HMD 105, the virtual viewpoint image generated by the rendering processing unit 209, to cause the virtual viewpoint image to be displayed on the display unit of the HMD 105. Additionally, the image output unit 211 outputs the virtual viewpoint image held by the image holding unit 210 to a broadcasting station and the like. Note that any or all of the image obtaining unit 201, the foreground/background separating unit 202, the foreground shape generating unit 203, and the background shape generating unit 204 may be external components of the image generating apparatus 100. Additionally, an external apparatus may be provided with a function of generating the first virtual viewpoint image and the second virtual viewpoint image, the function being included in the functions of the rendering processing unit 209.

Figure 3:
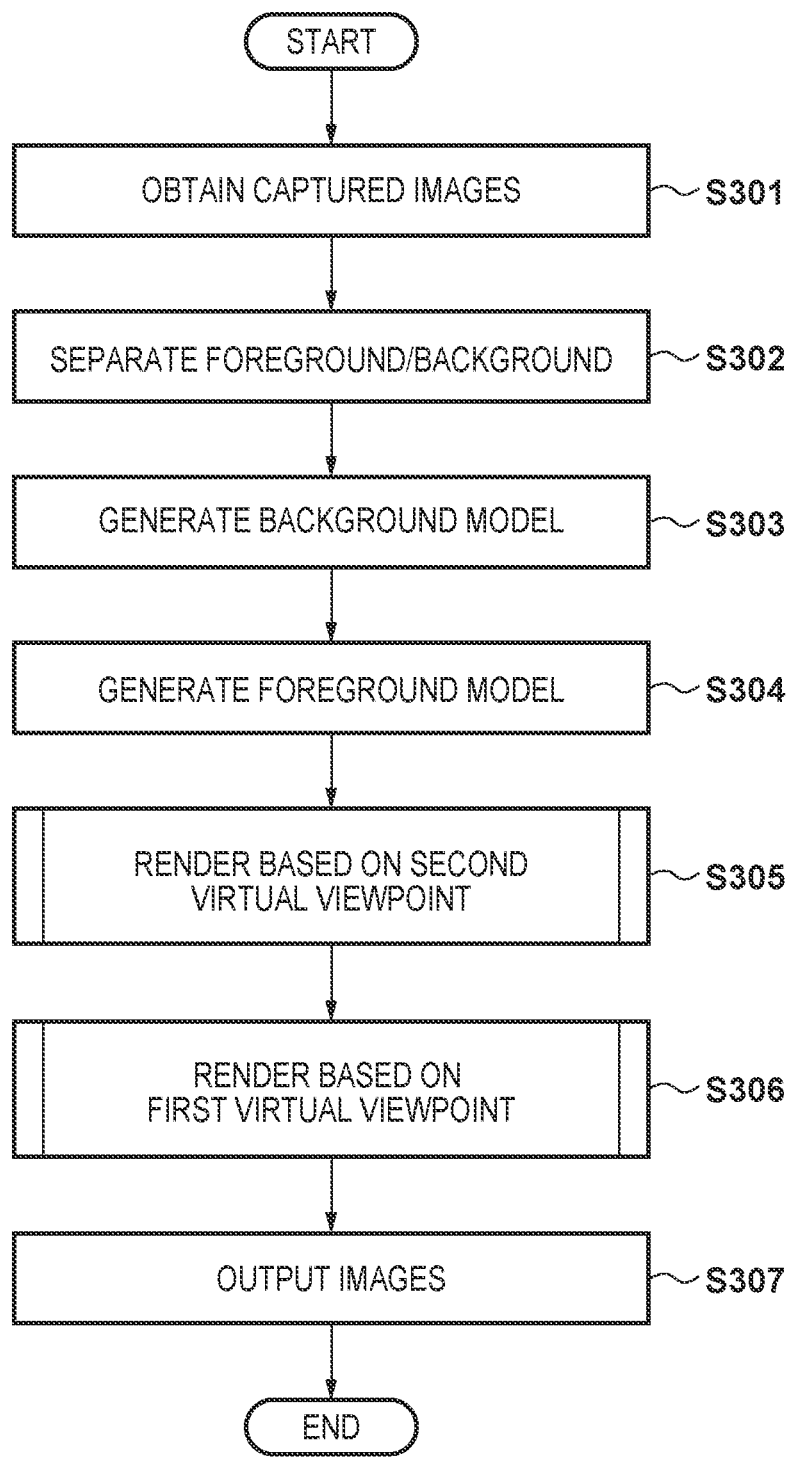
FIG. 3 is a flowchart illustrating image generation processing executed by the image generating apparatus of the first embodiment.

FIG. 3 is a flowchart illustrating a flow of processing of an image processing apparatus 100 according to the first embodiment. The flowchart in FIG. 3 illustrates a flow of processing for generating and outputting a virtual viewpoint image for one frame. Thus, the processing illustrated in FIG. 3 is repeated 60 times during one second to generate a virtual viewpoint image for 60 frames per second.

In a step S301, the image obtaining unit 201 obtains a plurality of images captured by the plurality of cameras 108. The obtained images have been captured in time synchronization with one another. In a step S302, the foreground/background separating unit 202 performs image processing for separating the foreground and the background from each other, on each of the plurality of images obtained by the image obtaining unit 201. Foreground/background separation can be achieved by a general method such as a background difference method. For example, in the background difference method, an image captured with no foreground is held, and the foreground can be obtained by acquiring a difference from the held image.

In a step S303, the background shape generating unit 204 generates a background shape model based on the background separated by the foreground/background separating unit 202. In a step S304, the foreground shape generating unit 203 generates a shape model of the foreground based on the foreground separated by the foreground/background separating unit 202. A general technology such as visual hull or photo hull can be used to generate these shape models. Note that the background model may be obtained, for example, from a stadium shape model prepared in advance or by measuring the shape of the stadium with a laser scanner or the like.

In a step S305, the rendering processing unit 209 performs rendering based on the second virtual viewpoint to generate a second virtual viewpoint image. As described above, the second virtual viewpoint means a virtual viewpoint (vector 1009 in FIG. 10C) obtained when the controller 107 held by the user is considered as a virtual camera. The second virtual viewpoint image generated in the step S305 is utilized for rendering as the texture of the virtual display 704 in a step S306 described below. The processing in the step S305 will be described below in detail with reference to the flowchart in FIG. 4.

In a step S306, the rendering processing unit 209 performs rendering based on the first virtual viewpoint to generate a first virtual viewpoint image. The first virtual viewpoint means a virtual viewpoint based on the positions of the right and left displays of the HMD 105 worn by the user. In this case, two first virtual viewpoints (vectors 1004 and 1007 in FIG. 10A) are present because the right and left displays are present. As a result, two first virtual viewpoint images for the right and left eyes are present. The processing in the step S306 will be described below in detail with reference to the flowchart in FIG. 5.

In a step S307, the image output unit 211 respectively outputs, to the right and left displays of HMD 105, two first virtual viewpoint images generated by the rendering processing unit 209. In this way, the rendering processing unit 209 and the image output unit 211 perform display control of displaying the second virtual viewpoint image within the first virtual viewpoint image. Additionally, the image output unit 211 outputs, to the broadcasting station and the like, the virtual viewpoint image held by the image holding unit 210 and ends the process. Note that the first virtual viewpoint image is an image generated for performing operations specifying a virtual viewpoint corresponding to the second virtual viewpoint image. Thus, among the virtual viewpoint images held by the image holding unit 210, the first virtual viewpoint image may be output only to the HMD 105, and the second virtual viewpoint image may be output to the broadcasting station or an external storage device. That is, the first virtual viewpoint image and the second virtual viewpoint image may be output to different destinations. Additionally, the output destination of the first virtual viewpoint image is not limited to the HMD 105 and may be another liquid crystal display or the like. Additionally, the apparatus displaying the first virtual viewpoint image and the operation unit for specifying the virtual viewpoint corresponding to the first virtual viewpoint image may be configured as different apparatuses.

Figure 4:
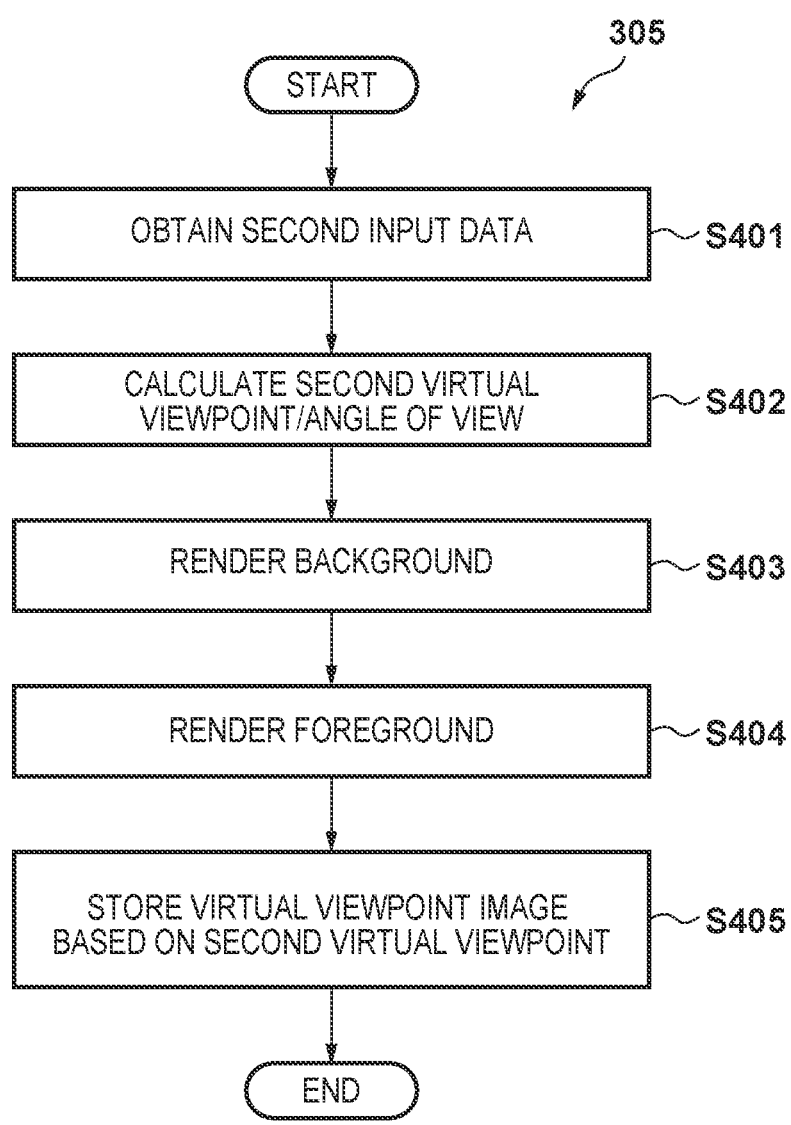
FIG. 4 is a flowchart illustrating rendering processing based on a second virtual viewpoint.

FIG. 4 is a flowchart illustrating a flow of the rendering processing based on the second virtual viewpoint in the step S305 in FIG. 3. As described above, the second virtual viewpoint means a virtual viewpoint of the virtual camera (vector 1009 in FIG. 10C) obtained in a case where the controller 107 held by the user is considered as the virtual camera 703.

In a step S401, the input data obtaining unit 205 obtains, from the controller 107, sensing data for identifying the position/orientation of the virtual camera 703. Additionally, the input data obtaining unit 205 obtains angle-of-view data (the angle of view of the virtual camera 703) about the virtual viewpoint image displayed on the virtual display 704 attached to the virtual camera 703. Note that the angle-of-view data about the virtual viewpoint image is intended to be prepared in advance but that, of course, no such limitation is intended. For example, a user may set the angle of view of the virtual camera 703 via the controller 107 or the like. Thus, the second input data pertaining to the second virtual viewpoint is obtained.

In a step S402, the position/orientation calculating unit 206 calculates the position/orientation of the controller 107 in the device coordinate system based on the sensing data about the controller 107 obtained by the input data obtaining unit 205. Subsequently, the virtual-viewpoint calculating unit 207 converts the position/orientation of the controller 107 into the position/orientation (virtual viewpoint) of the virtual camera in the device coordinate system based on the model of the virtual camera held by the virtual-object-model holding unit 208. Furthermore, coordinate conversion from the device coordinate system into the stadium coordinate system yields a second virtual viewpoint and the angle of view in the stadium coordinate system. In this way, the second virtual viewpoint and the angle of view are obtained based on the second input data.

In a step S403, the rendering processing unit 209 renders a background for the virtual viewpoint image as seen from the second virtual viewpoint. A background model generated by the background shape generating unit 204 and a captured image obtained by the image obtaining unit 201 are utilized for rendering the background. In a step S404, the rendering processing unit 209 renders a foreground for the virtual viewpoint image as seen from the second virtual viewpoint. A foreground model generated by the foreground shape generating unit 203 and a captured image obtained by the image obtaining unit 201 are utilized for rendering the foreground. As described above, the rendering processing unit 209 generates a second virtual viewpoint image based on the plurality of captured images and the second virtual viewpoint.

In a step S405, the rendering processing unit 209 superimposes the result of the foreground rendering in the step S404 on the result of the background rendering in the step S403 to generate a second virtual viewpoint image as seen from the second virtual viewpoint. Then, the rendering processing unit 209 stores the second virtual viewpoint image in the image holding unit 210.

Figure 5:
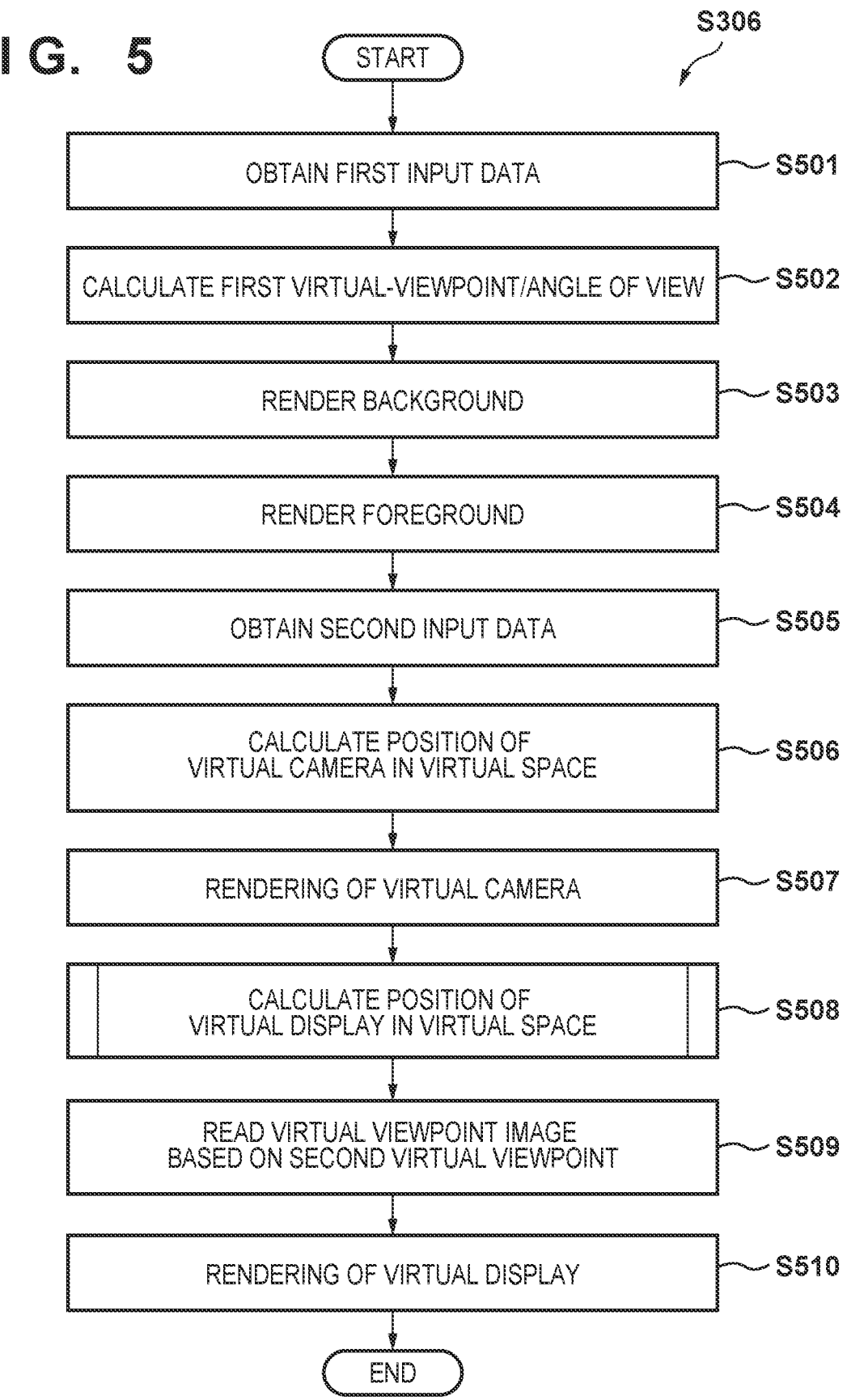
FIG. 5 is a flowchart illustrating rendering processing based on a first virtual viewpoint.

FIG. 5 is a flowchart illustrating rendering processing based on the first virtual viewpoint in the step S306 in FIG. 3. As described above, the first virtual viewpoint means a virtual viewpoint based on the positions of the right and left displays of the HMD 105 worn by the user. In this case, since the right and left displays present, two first virtual viewpoints (vectors 1004 and 1007 in FIG. 10A) are present, and two first virtual viewpoint images to be generated are also present.

The input data obtaining unit 205 and the virtual-viewpoint calculating unit 207 are an example of a first designation unit designating a first virtual viewpoint for generating a virtual viewpoint image in a three-dimensional virtual space that can be reproduced by a plurality of captured images captured by the plurality of cameras 108. First, in a step S501, the input data obtaining unit 205 obtains, from the HMD 105, the sensing data for identifying the position/orientation of the HMD 105. Additionally, the input data obtaining unit 205 obtains the angle-of-view data about the virtual viewpoint image displayed on the right and left displays of the HMD 105. The angle-of-view data about the virtual viewpoint image displayed on the display is intended to be prepared in advance, but no such limitation is intended. For example, the user may set the angle of view via the controller 107 or the like. Thus, first input data pertaining to the first virtual viewpoint is obtained.

In a step S502, the position/orientation calculating unit 206 calculates the position/orientation of the HMD 105 in the device coordinate system based on the HMD 105 sensing data obtained by the input data obtaining unit 205. Furthermore, the virtual-viewpoint calculating unit 207 calculates the position and direction of each of the right and left displays of the HMD 105 based on the calculated position/orientation of the HMD 105 and the model of the HMD 105 held by the virtual-object-model holding unit 208. The virtual-viewpoint calculating unit 207 sets the calculated positions and orientations of the right and left displays as virtual viewpoints (vectors 1004 and 1007) in the device coordinate system. Furthermore, the virtual-viewpoint calculating unit 207 performs coordinate conversion from the device coordinate system into the stadium coordinate system to obtain a first virtual viewpoint and the angle of view in the stadium coordinate system. Thus, the first virtual viewpoint and the angle of view are obtained based on the first input data.

In a step S503, the rendering processing unit 209 renders a background for the virtual viewpoint image as seen from the first virtual viewpoint. A background model generated by the background shape generating unit 204 and a captured image obtained by the image obtaining unit 201 are utilized for rendering the background. In a step S504, the rendering processing unit 209 renders a foreground for the virtual viewpoint image as seen from the first virtual viewpoint. A foreground model generated by the foreground shape generating unit 203 and a captured image obtained by the image obtaining unit 201 are utilized for rendering the foreground. With the above-described processing, the rendering processing unit 209 generates the first virtual viewpoint image based on the plurality of captured images and the first virtual viewpoint.

As described above, the rendering processing unit 209 obtains the first virtual viewpoint image in steps S503 and S504 and obtains the second virtual viewpoint image in steps S403 and S404. That is, the rendering processing unit 209 is an example of an obtaining unit obtaining a first virtual viewpoint image corresponding to the first virtual viewpoint and a second virtual viewpoint image corresponding to a second virtual viewpoint designated by operation (operation of moving the controller) independent of operation of designating the first virtual viewpoint (operation of moving the HMD). Note that, as described above, at least one of the first virtual viewpoint image and the second virtual viewpoint image may be obtained from the external apparatus. Additionally, in the present embodiment, the first virtual viewpoint is designated, for example, by the HMD 105, and the second virtual viewpoint is designated, for example, by the controller 107.

Then, in a step S505, the input data obtaining unit 205 obtains, from the controller 107, the sensing data for identifying the position/orientation of the virtual camera 703. In a step S506, the position/orientation calculating unit 206 calculates the position/orientation of the controller 107 in the device coordinate system based on the sensing data about the controller 107 obtained by the input data obtaining unit 205. Subsequently, the virtual-viewpoint calculating unit 207 converts the position/orientation of the controller 107 into the position/orientation of the virtual camera 703 in the device coordinate system based on the model data about the virtual camera held by the virtual-object-model holding unit 208. Since the position/orientation of the obtained virtual camera 703 is represented in the device coordinate system, the coordinate system is further converted from the device coordinate system into the stadium coordinate system. Thus, the position/orientation of the virtual camera in the stadium coordinate system is calculated.

In a step S507, the rendering processing unit 209 renders the virtual camera 703. The rendering processing unit 209 renders the virtual camera 703 as seen from the first virtual viewpoint using the model data about the virtual camera 703 held by the virtual-object-model holding unit 208. Note that because the virtual camera 703 does not actually exist, CG is intended to be created in advance, or a texture is intended to be prepared by utilizing a photograph of an existing camera.

In a step S508, the rendering processing unit 209 calculates the position, in the stadium coordinate system, of the virtual display 704, which is an example of a virtual display area attached to the virtual camera 703. The calculation uses the sensing data identifying the position/orientation of the controller 107 obtained by the input data obtaining unit 205 in the step S505; and the model data about the virtual camera 703 held by the virtual-object-model holding unit 208. In the present embodiment, the model data about the virtual camera 703 is intended to include the model data about the virtual display 704. The rendering processing unit 209 calculates the position/orientation of the virtual display 704 based on the model data about the virtual camera 703 and the position/orientation in the stadium coordinate system. The rendering processing unit 209, which performs the above-described steps S505 to S508, is an example of a configuration functioning as a setting unit of setting a virtual display area in the three-dimensional virtual space. That is, the rendering processing unit 209 has the function of setting the three-dimensional coordinates of the virtual display area (display position) in the three-dimensional space of the virtual viewpoint images observed by the HMD 105.

In a step S509, the rendering processing unit 209 reads the virtual viewpoint image based on the second virtual viewpoint held by the image holding unit 210. The second virtual viewpoint image is held by the image holding unit 210 in the step S405. In a step S510, the rendering processing unit 209 renders a second virtual viewpoint image in the display area 705 of the display position determined in accordance with the position/orientation of the virtual display 704 calculated in the step S508. That is, the second virtual viewpoint image based on the second virtual viewpoint is utilized as the texture of the screen (display area 705) of the virtual display 704.

In the above-described steps S503, S504, S507, and S510, the background, foreground, virtual camera, and virtual display are rendered, respectively. The rendering results are superimposed as virtual viewpoint images in order of the processing in these steps. For the superimposition, occlusion processing is performed with an anteroposterior relationship between each object taken into account. Thus, once the rendering in the step S510 is completed, the virtual viewpoint image as seen from the first virtual viewpoint will be completed. As described above, the rendering processing unit 209 is an example of a configuration functioning as a rendering unit of rendering a first virtual viewpoint image and a virtual display area and rendering a second virtual viewpoint image in the virtual display area.

As described above, in the first embodiment, the second virtual viewpoint image as seen from the second virtual viewpoint is created and utilized as a texture when the first virtual viewpoint image as seen from the first virtual viewpoint is created (steps S508 to S510). Thus, the second virtual viewpoint image is displayed within the first virtual viewpoint image. Accordingly, even in the three-dimensional virtual space constructed of the virtual viewpoint image, another virtual viewpoint image can be viewed.

Note that in the above-described embodiment, a case has been described in which the position of the virtual display 704 is fixed as part of the virtual camera 703 but that no such limitation is intended and that the position of the virtual display 704 may be controlled in accordance with the circumstances. To achieve smooth camera operations on the virtual viewpoint image, the movement of the foreground (player or ball) needs to be continuously checked with moving the virtual camera 703. However, due to the positional relationship between the foreground and the virtual camera 703, the virtual display 704 may occlude the foreground, possibly hindering the camera operations. Thus, in a case where the virtual display 704 can be displayed at a position where the foreground is not occluded, this may contribute to smooth camera operations when the virtual viewpoint images are obtained.

Figure 6:
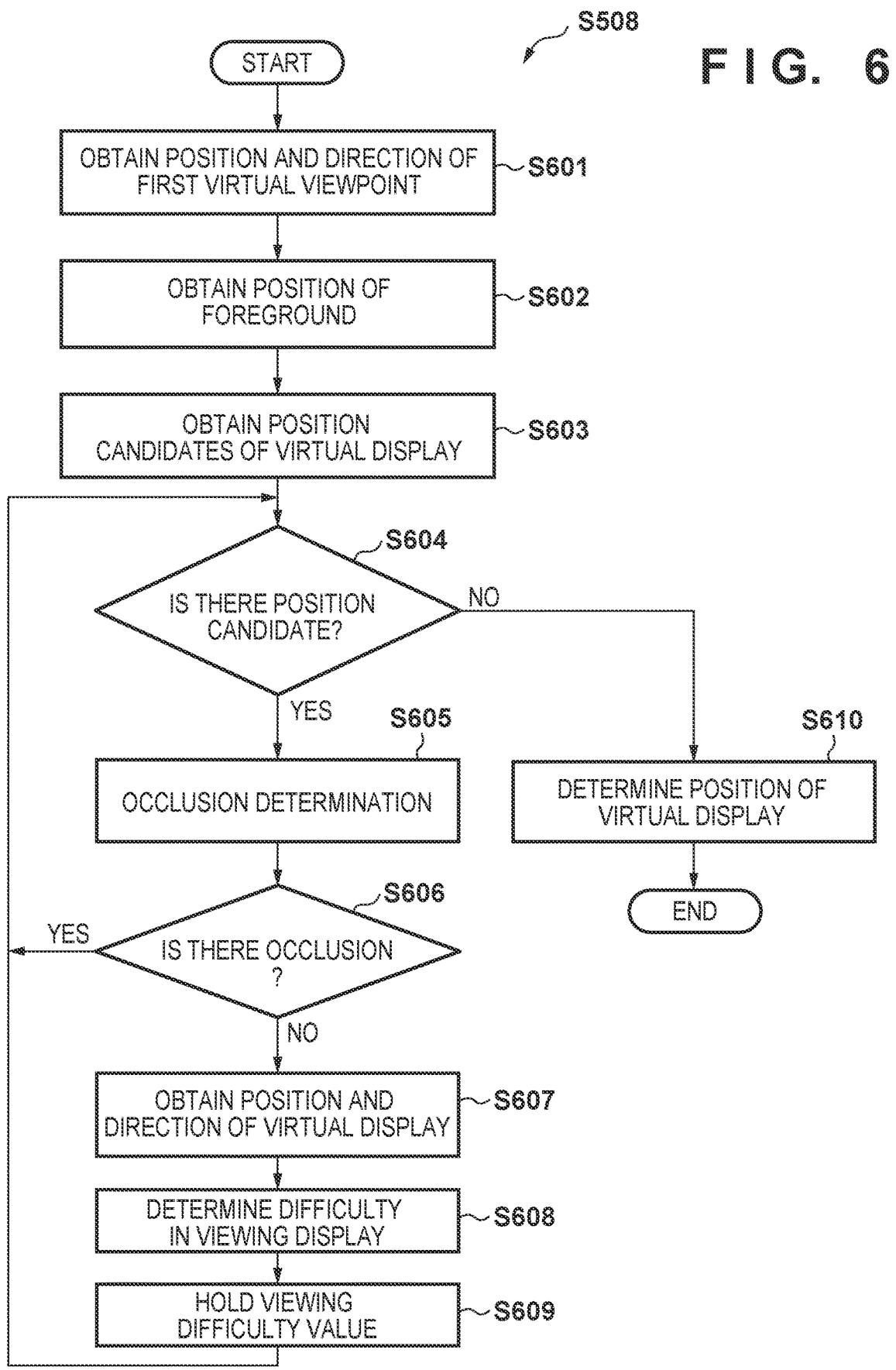
FIG. 6 is a flowchart illustrating display position control of a virtual display.

In the above-described step S508, the position and orientation of the virtual display 704 (virtual display area) are uniquely calculated based on the position/orientation of the controller 107. In contrast, the position of the virtual display 704 (virtual display area) may be determined in accordance with the position of the foreground present in the first virtual viewpoint image. FIG. 6 is a flowchart illustrating an example of processing for controlling the position of the virtual display 704 in accordance with the positional relationship of the foreground in the step S508.

In a step S601, the rendering processing unit 209 obtains the position and orientation of the first virtual viewpoint calculated in the step S502. In a step S602, the rendering processing unit 209 obtains the position of the foreground from the foreground shape generating unit 203. In a step S603, the rendering processing unit 209 calculates position candidates for the virtual display 704 (display position) in the stadium coordinate system based on the position of the controller 107 obtained from the position/orientation calculating unit 206. At this time, the position candidates for the virtual display 704 in the present embodiment are assumed to be three positions at the top, at the right, and at the left of the virtual camera 703. Note that the information indicating the candidate positions of the virtual display 704 is intended to be included in the model data about the virtual camera 703 and to be held by the virtual-object-model holding unit 208.

In a step S604, one unprocessed position candidate is selected from the position candidates for the virtual display. In a case where no unprocessed position candidate remains, the processing moves to a step S610. In a step S605, the rendering processing unit 209 makes an occlusion determination. The occlusion determination refers to determination whether the foreground obtained in the step S602 is occluded by the virtual display 704 in a case where the image is seen from the first virtual viewpoint obtained in the step S601. In a case where the foreground is determined to be occluded by the virtual display 704 (YES in the step S606), the processing returns to the step S604 to select the next position candidate. On the other hand, in a case where the foreground is determined not to be occluded by the virtual display 704 (NO in the step S606), the processing proceeds to a step S607. That is, the positions of the virtual display 704 where the foreground is occluded are excluded from the candidates, and for the positions of the virtual display 704 where the foreground is not occluded, the processing proceeds to the step S607 and subsequent steps in which difficulty in viewing the display is determined. As a result, the position (display position) of the virtual display 704 is determined such that a specific object present in a capturing target area of the camera 108 (e.g., the foreground present in the first virtual viewpoint image) is not occluded.

In the step S607, the rendering processing unit 209 obtains the position/orientation of the virtual display 704 selected in the step S604. In a step S608, the rendering processing unit 209 determines difficulty in viewing the display of the virtual display 704 as seen from the first virtual viewpoint. For the determination of difficulty in viewing the display, the position and orientation of the virtual display 704 as seen from the first virtual viewpoint is taken into account. First, with respect to the position, the viewing difficulty is determined to be lower for a position closer to the center of angle of view and to be higher for a position farther from the center of the angle of view. In addition, with respect to the direction, the viewing difficulty is determined to be lower for a straighter view and to be higher for a view with a larger angular deviation from the straight view. The viewing difficulties pertaining to the position and orientation are quantified into a numerical value to determine a total viewing difficulty. In a step S609, the numerical value of the viewing difficulty for the position candidate for the virtual display 704 selected in the step S604 is held. Subsequently, the processing returns to the step S604.

In the step S610, the rendering processing unit 209 determines the position of the virtual display 704 based on the value of the viewing difficulty for each position candidate for the virtual display 704 held in the step S609. In this way, the rendering processing unit 209 determines, from a plurality of the position candidates for the virtual display 704, the position candidate having the smallest viewing difficulty value (easiest-to-see position candidate) as the position of the virtual display 704. As described above, according to the present embodiment, a higher evaluation value is calculated for a position of the surface of the virtual display area closer to the position where the surface lies right opposite the first virtual viewpoint and is calculated for a position of the virtual display area closer to the center of the first virtual viewpoint image, and the virtual display area is set based on the evaluation value.

Note that a step may be provided in which, in a case where the value of the viewing difficulty for the position of the virtual display 704 determined in the step S610 is larger than a threshold value, the rendering processing unit 209 changes the direction of the virtual display 704 to reduce the viewing difficulty value below the threshold value. For example, the viewing difficulty can be reduced by controllably preventing the direction (normal direction) of the display surface of the virtual display 704 as seen from the first virtual viewpoint from lying at an angle of 45 degrees or larger from the position where the display surface lies right opposite the first virtual viewpoint. Additionally, the position and direction of the virtual display area are considered as evaluation values, but one of the position or the direction may be considered. For example, the difference between the line-of-sight direction of the first virtual viewpoint and the normal direction of the display surface of the virtual display area may be limited to be smaller than or equal to a threshold value.

Additionally, in the step S603, a case has been described in which a position candidate for the virtual display 704 is obtained. However, no such limitation is intended, and, for example, candidates for the size, orientation, or shape may be obtained.

Figure 8A:
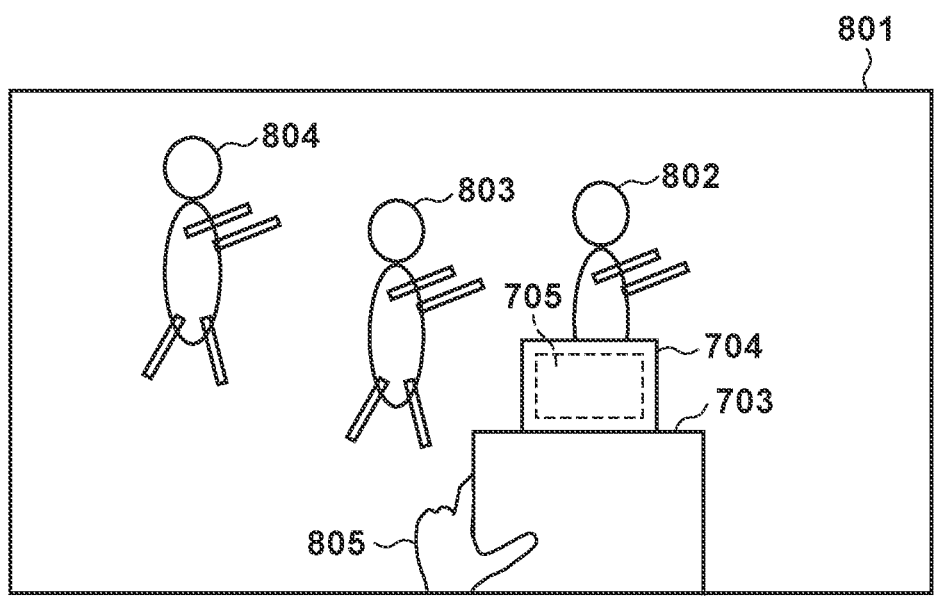
FIGS. 8A and 8B are schematic diagrams illustrating a result of controlling the position of a virtual display.
Figure 8B:
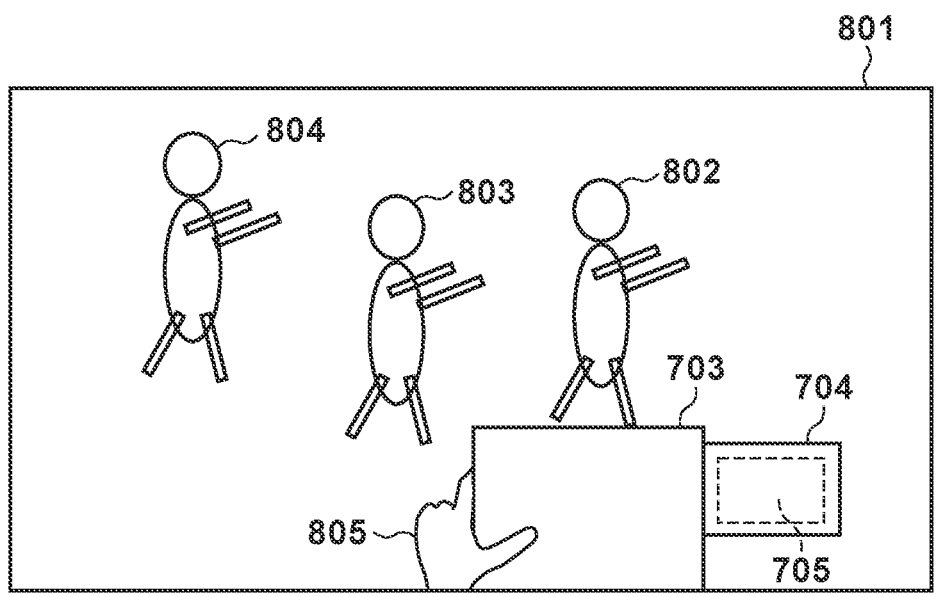

FIGS. 8A and 8B are schematic diagrams illustrating an example of a first virtual viewpoint image based on a first virtual viewpoint determined based on the position and orientation of the HMD 105. FIGS. 8A and 8B illustrate a state in which foregrounds (players) 802, 803, and 804 and a virtual hand 805 of the user are displayed in a first virtual viewpoint image 801. The virtual hand 805 is intended to be held by the virtual-object-model holding unit 208. Displaying the virtual hand 805 has the effect of enhancing the understanding that the user is controlling the virtual camera on the user's own. The virtual camera 703, the virtual display 704, and the display area 705 are as described above. The display area 705 in first virtual viewpoint image 801 displays a second virtual viewpoint image based on a second virtual viewpoint determined based on the position and orientation of controller 107.

FIG. 8A is a schematic diagram illustrating a case where the virtual display 704 is disposed on the top of the virtual camera 703. The virtual display 704 disposed at this position occludes the feet of the player 802, which is an object in the foreground. According to the above-described embodiment, the virtual display 704 is disposed taking into consideration the positional relationship between the foreground and the virtual display 704. FIG. 8B is a schematic diagram illustrating a case where the virtual display 704 is disposed on the right of the virtual camera 703. Compared to FIG. 8A, FIG. 8B indicates that the virtual display 704 disposed at this position allows the virtual viewpoint image based on the second virtual viewpoint to be viewed without occluding the player 802, which is the foreground.

As described above, by controlling the position of the virtual display in accordance with the positional relationship of the foreground, the virtual display is prevented from occluding the foreground, thus contributing to smooth camera operations. Note that, in the example described above, the position of the virtual display is determined based on the position of the virtual camera but that no such limitation is intended. For example, the second virtual viewpoint image may be displayed fixed at a predetermined position (for example, in a corner) within the first virtual viewpoint image or displayed at a position selected from a plurality of predetermined positions based on the position of the foreground or the like. Additionally, for example, the position of the virtual display may be fixed at a predetermined position within the three-dimensional virtual space 702 corresponding to the first virtual viewpoint image. Additionally, the second virtual viewpoint image may be displayed outside the first virtual viewpoint image. For example, the first virtual viewpoint image and the second virtual viewpoint image may be displayed side-by-side within the display of HMD 105.

Second Embodiment

Note that, in the first embodiment, examples of a configuration enabling observation, in a common three-dimensional virtual space, of a virtual viewpoint image from another virtual viewpoint; and of camera operations on the virtual viewpoint image have been described. That is, both of an image used to generate a first virtual viewpoint image and an image used to generate a second virtual viewpoint image are intended to be obtained by capturing the same image capturing area. However, no such limitation is intended. For example, the second virtual viewpoint image may be generated based on a plurality of captured images and a second virtual viewpoint obtained by a second set of a plurality of cameras different from a first set of the plurality of cameras 108 that generates the first virtual viewpoint image. That is, the image used to generate the first virtual viewpoint image and the image used to generate the second virtual viewpoint image may be intended to be obtained by capturing different image capturing areas. In a second embodiment, an example will be described in which public viewing in a three-dimensional virtual space is realized by displaying a different virtual viewpoint image on a virtual screen provided within the three-dimensional virtual space constructed of a freely selectable virtual viewpoint image.

Figure 9A:
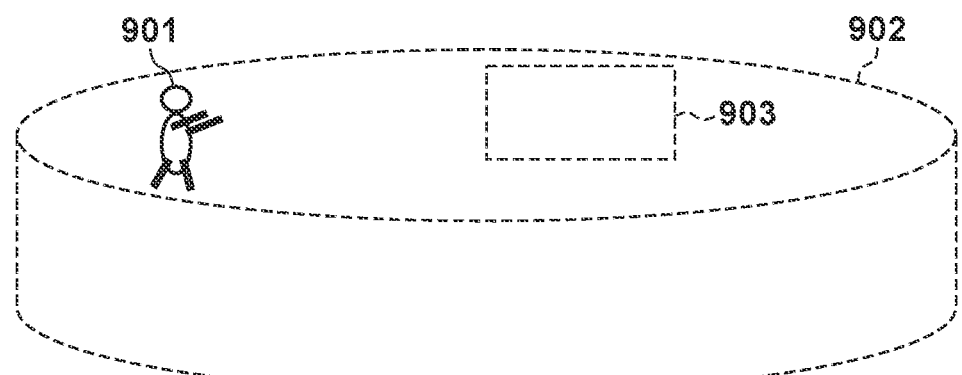
FIGS. 9A to 9C are schematic diagrams illustrating application to public viewing.
Figure 9B:
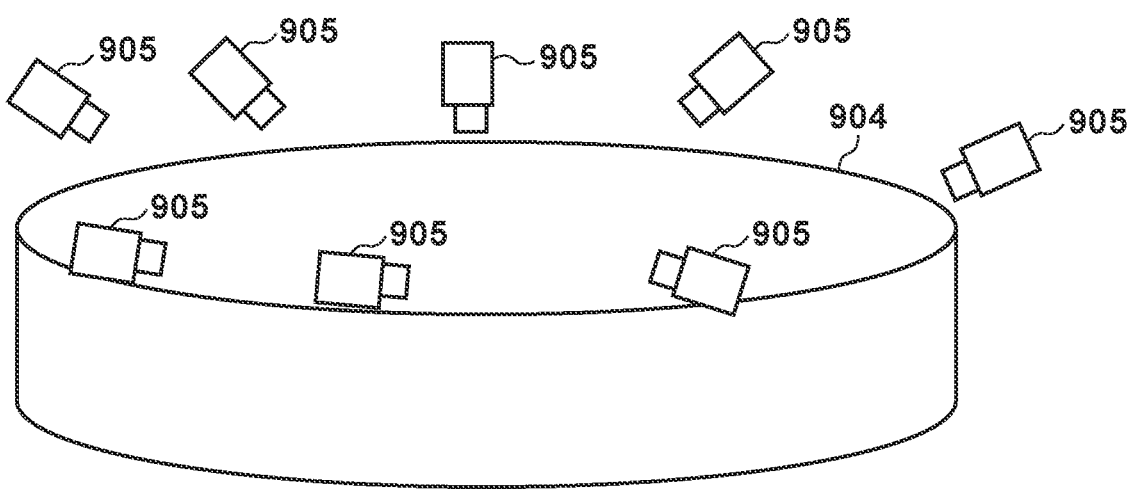
Figure 9C:
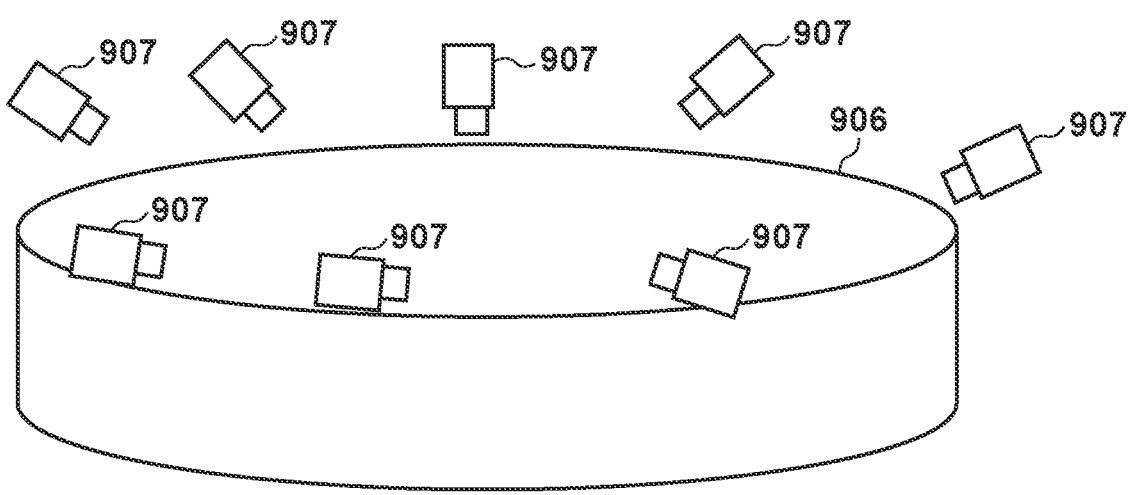

FIGS. 9A to 9C are schematic diagrams illustrating an example in which the technology relating to the first embodiment is applied to public viewing. FIG. 9A illustrates that a user 901 is viewing a virtual viewpoint image displayed on a virtual screen 903 (virtual display area) within a three-dimensional virtual space 902 constructed of a virtual viewpoint image. Dotted lines are intended to represent the virtual viewpoint image. FIG. 9B is a schematic diagram illustrating that a game being played in a stadium-A 904 is captured by a plurality of cameras 905 belonging to a first set. In FIG. 9A, 902 denotes a three-dimensional virtual space constructed of a virtual viewpoint image generated based on images synchronously captured with a plurality of cameras 905.

FIG. 9C is a schematic view illustrating that a game being played in a stadium-B 906 is captured by a plurality of cameras 907 belonging to a second set different from the first set. A virtual viewpoint image generated based on images synchronously captured with the plurality of cameras 907 is displayed on the virtual screen 903 in FIG. 9A. In this case, the first virtual viewpoint is associated with an HMD worn by the user 901, and the second virtual viewpoint is associated with a virtual camera (not shown) disposed in the stadium-B 906 in FIG. 9C. Thus, in the second embodiment, the three-dimensional virtual space where the first virtual viewpoint is generated is different from the three-dimensional virtual space in which the second virtual viewpoint is generated. Note that the user 901 may be allowed to indicate the position and orientation of the virtual camera disposed in the stadium-B 906.

In this way, the user 901 can watch the game being played in the stadium-B 906 through public viewing using a virtual screen, while watching, in the three-dimensional virtual space, the game being played in the stadium-A 904. That is, the game being played in the stadium-A 904 can be three-dimensionally watched in the three-dimensional virtual space constructed of the virtual viewpoint image, while the game being played in the stadium-B 906 can be watched as a virtual viewpoint image displayed on a large-scale video screen in the same three-dimensional virtual space.

Note that the configuration of the second embodiment is the same as that of the first embodiment (FIG. 1 and FIG. 2). However, the second embodiment includes a first set of the plurality of cameras 108 and a second set of a plurality of cameras. Additionally, the image obtaining unit 201, the foreground/background separating unit 202, the foreground shape generating unit 203, and the background shape generating unit 204 each separately perform processing between the first set of camera group and the second set of camera group. Additionally, the virtual-object-model holding unit 208 holds model data about the virtual screen 903. Furthermore, the rendering processing unit 209 generates a first and a second virtual viewpoint images based on captured images respectively obtained from the first set of camera group and the second set of camera group.

As described above, according to each of the above-described embodiments, rendering the generated virtual viewpoint image as a part of the texture allows a virtual viewpoint image to be viewed in a three-dimensional virtual space constructed of a virtual viewpoint image.

According to the above-described embodiment, while a virtual viewpoint image corresponding to a certain virtual viewpoint is being viewed, another virtual viewpoint image can be viewed that corresponds to another virtual viewpoint designated separately from the above-described virtual viewpoint.

Note that the above-described embodiments include a configuration in which a virtual viewpoint image is viewed in a three-dimensional virtual space constructed of a virtual viewpoint image, and various applications other than the above-described public viewing are conceivable. The embodiments are applicable to, for example, comparison of forms of golf or baseball, check of the line of sight of an opponent during training in martial arts, and navigation of a virtual drone.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-025788, filed Feb. 15, 2019, which is hereby incorporated by reference herein in its entirety.

What is claimed is:

1. An image processing apparatus comprising:
one or more hardware processors; and
one or more memories storing one or more programs configured to be executed by the one or more hardware processors, the one or more programs including instructions for:
obtaining a plurality of images based on image capturing performed by a plurality of image capturing apparatuses;
receiving an input corresponding to operation of a first device;
receiving an input corresponding to operation of a second device different from the first device; and
generating, based on the obtained plurality of images, a first virtual viewpoint image corresponding to a first virtual viewpoint determined based on the received input corresponding to the operation of the first device and a second virtual viewpoint image which corresponds to a second virtual viewpoint determined based on the received input corresponding to the operation of the second device and is displayed with the first virtual viewpoint image.

2. The image processing apparatus according to claim 1, wherein
an image used to generate the first virtual viewpoint image and an image used to generate the second virtual viewpoint image are both obtained by capturing the same image capturing area.

3. The image processing apparatus according to claim 1, wherein
an image used to generate the first virtual viewpoint image and an image used to generate the second virtual viewpoint image are each obtained by capturing different image capturing areas.

4. The image processing apparatus according to claim 1, wherein
the first device is operated to designate a position of the first virtual viewpoint and an orientation of view from the first virtual viewpoint, and
the second device is operated to designate a position of the second virtual viewpoint and an orientation of view from the second virtual viewpoint.

5. The image processing apparatus according to claim 1, wherein
the first device is a head-mounted display, and
the operation of the first device includes operation of moving the head-mounted display.

6. Image processing apparatus according to claim 5, wherein
the second device is a controller including a sensor configured to detect a position and a sensor configured to detect an orientation, and
the operation of the second device includes operation of moving the controller.

7. The image processing apparatus according to claim 1, wherein
a display position of the second virtual viewpoint image is determined in accordance with the operation of the first device and the operation of the second device.

8. The image processing apparatus according to claim 1, wherein
the second virtual viewpoint image is displayed in a three-dimensional space associated with the first virtual viewpoint image.

9. The image processing apparatus according to claim 8, wherein
a position and an orientation of a display surface of the second virtual viewpoint image in the three-dimensional space are determined in accordance with the operation of the second device.

10. The image processing apparatus according to claim 9, wherein
the orientation of the display surface is determined such that a difference between a line-of-sight direction of a virtual viewpoint corresponding to the first virtual viewpoint image and a normal direction of the display surface is equal to or smaller than a threshold value.

11. The image processing apparatus according to claim 1, wherein
a display position of the second virtual viewpoint image is determined based on a position of a specific object being present in a capturing target area captured by the plurality of image capturing apparatuses.

12. The image processing apparatus according to claim 11, wherein
the display position of the second virtual viewpoint image in the first virtual viewpoint image is determined such that the specific object is not occluded by the second virtual viewpoint image in the first virtual viewpoint image.

13. The image processing apparatus according to claim 1, wherein the first virtual viewpoint image and the second virtual viewpoint image are displayed on a display screen of the first device.

14. The image processing apparatus according to claim 1, wherein
the first virtual viewpoint image is an image used by a user to perform operation of designating a virtual viewpoint corresponding to the second virtual viewpoint image.

15. The image processing apparatus according to claim 1, wherein
the first device and the second device are configured to be operated independently.

16. The image processing apparatus according to claim 1, wherein
the first virtual viewpoint image includes, in addition to the second virtual viewpoint image, an image of a virtual camera displayed with the first virtual viewpoint image, the image of the virtual camera changing in position and orientation in response to the operation of the second device.

17. An image processing method comprising:
obtaining a plurality of images based on image capturing performed by a plurality of image capturing apparatuses;
receiving an input corresponding to operation of a first device;
receiving an input corresponding to operation of a second device different from the first device; and
generating, based on the obtained plurality of images, a first virtual viewpoint image corresponding to a first virtual viewpoint determined based on the received input corresponding to the operation of the first device and a second virtual viewpoint image which corresponds to a second virtual viewpoint determined based on the received input corresponding to the operation of the second device and is displayed with the first virtual viewpoint image.

18. The image processing method according to claim 17, wherein
the first device is a head-mounted display, and
the operation of the first device includes operation of moving the head-mounted display.

19. The image processing method according to claim 17, wherein
a display position of the second virtual viewpoint image is determined in accordance with the operation of the first device and the operation of the second device.

20. A non-transitory computer readable storage medium storing a program for causing a computer to perform an image processing method, the method comprising:
obtaining a plurality of images based on image capturing performed by a plurality of image capturing apparatuses;
receiving an input corresponding to operation of a first device;
receiving an input corresponding to operation of a second device different from the first device; and
generating, based on the obtained plurality of images, a first virtual viewpoint image corresponding to a first virtual viewpoint determined based on the input corresponding to the operation of the first device and a second virtual viewpoint image which corresponds to a second virtual viewpoint determined based on the received input corresponding to the operation of the second device and is displayed with the first virtual viewpoint image.

* * * * *